(12) United States Patent
Abedraboh et al.

(10) Patent No.: US 11,633,803 B2
(45) Date of Patent: Apr. 25, 2023

(54) REMOTE CONTROL FOR EXOTHERMIC REACTION MOLD

(71) Applicant: Hubbell Incorporated, Shelton, CT (US)

(72) Inventors: Mamoon Tawfig Abedraboh, Tulsa, OK (US); Todd Carlton Lehmann, Broken Arrow, OK (US)

(73) Assignee: HUBBELL INCORPORATED, Shelton, CT (US)

( * ) Notice: Subject to any disclaimer, the term of this patent is extended or adjusted under 35 U.S.C. 154(b) by 143 days.

(21) Appl. No.: 16/502,103

(22) Filed: Jul. 3, 2019

(65) Prior Publication Data

US 2020/0038991 A1 Feb. 6, 2020

Related U.S. Application Data

(63) Continuation of application No. 15/435,063, filed on Feb. 16, 2017, now Pat. No. 10,350,703.

(60) Provisional application No. 62/295,890, filed on Feb. 16, 2016.

(51) Int. Cl.
*B23K 23/00* (2006.01)
*B23K 101/10* (2006.01)
*B23K 101/32* (2006.01)

(52) U.S. Cl.
CPC .......... *B23K 23/00* (2013.01); *B23K 2101/10* (2018.08); *B23K 2101/32* (2018.08)

(58) Field of Classification Search
CPC ........................... B23K 23/00; B23K 2101/32; B23K 2101/06; B23K 25/00; B23K 35/262; B23K 35/264; B23K 37/06
See application file for complete search history.

(56) References Cited

U.S. PATENT DOCUMENTS

| 3,865,305 | A | 2/1975 | Sampey |
| 4,677,620 | A | 6/1987 | Sutton et al. |
| 5,621,639 | A * | 4/1997 | Fray ..................... G05B 19/042 700/86 |
| 5,829,510 | A | 11/1998 | Fuchs |
| 6,994,244 | B2 | 2/2006 | Harger et al. |
| 10,350,703 | B2 * | 7/2019 | Abedraboh ............ B23K 23/00 |
| 2007/0262065 | A1 * | 11/2007 | Peters ..................... B23K 9/32 219/130.5 |
| 2009/0045970 | A1 * | 2/2009 | Miyabayashi ... H04N 21/42221 340/4.3 |
| 2009/0313549 | A1 * | 12/2009 | Casner ................. G05B 19/406 715/740 |
| 2011/0132967 | A1 | 6/2011 | Lofton et al. |
| 2012/0055979 | A1 | 3/2012 | Alghusain |

(Continued)

OTHER PUBLICATIONS

PCT International Search Report and Written Opinion dated May 4, 2017 from corresponding Application No. PCT/US2017/018202, 12 pages.

*Primary Examiner* — Erin B Saad
(74) *Attorney, Agent, or Firm* — Dilworth IP, LLC

(57) ABSTRACT

A programmable exothermic reaction controller includes input/output control circuitry for inputting and outputting information to/from the controller, processing circuitry including user programmable parameters, wherein the parameters are programmable using the input/output control circuitry and an output connector connectable to an ignitor cable.

11 Claims, 17 Drawing Sheets

(56) References Cited

U.S. PATENT DOCUMENTS

2015/0171600 A1 6/2015 Burrows
2015/0328716 A1 11/2015 Duart Álvarez Cienfuegos

* cited by examiner

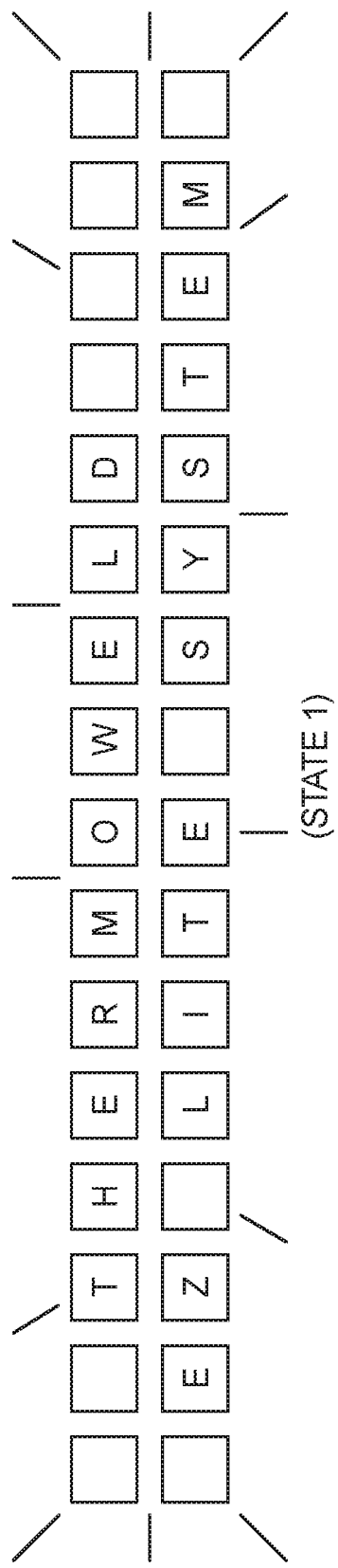
Fig. 8 (STATE 1)
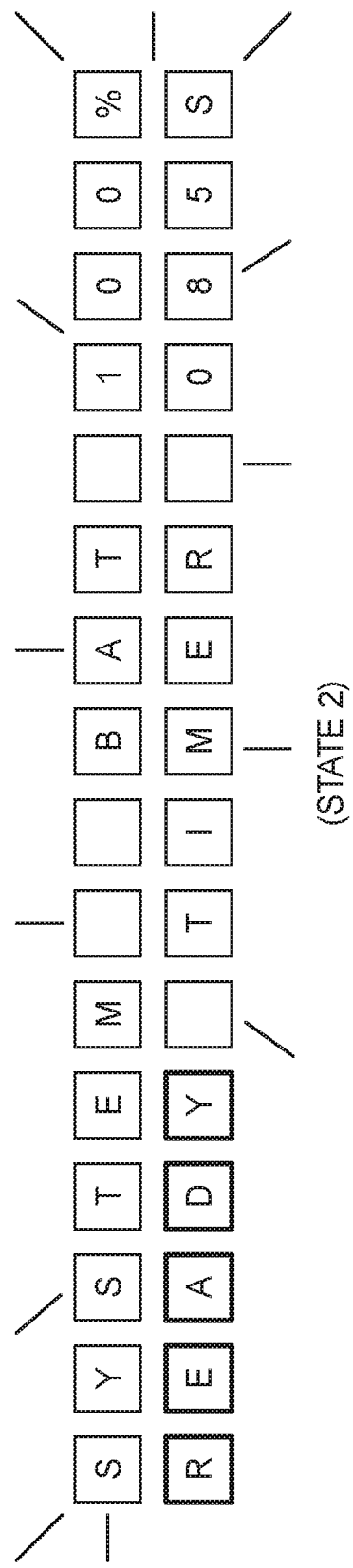
Fig. 9 (STATE 2)

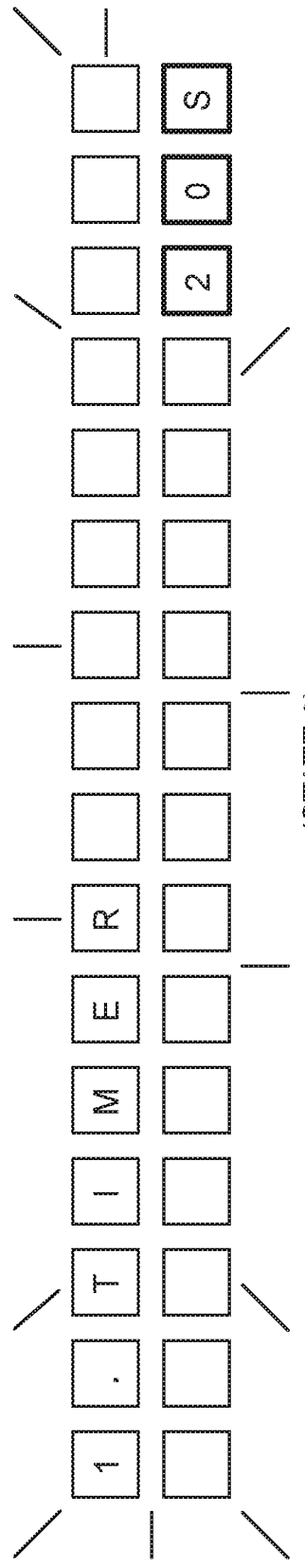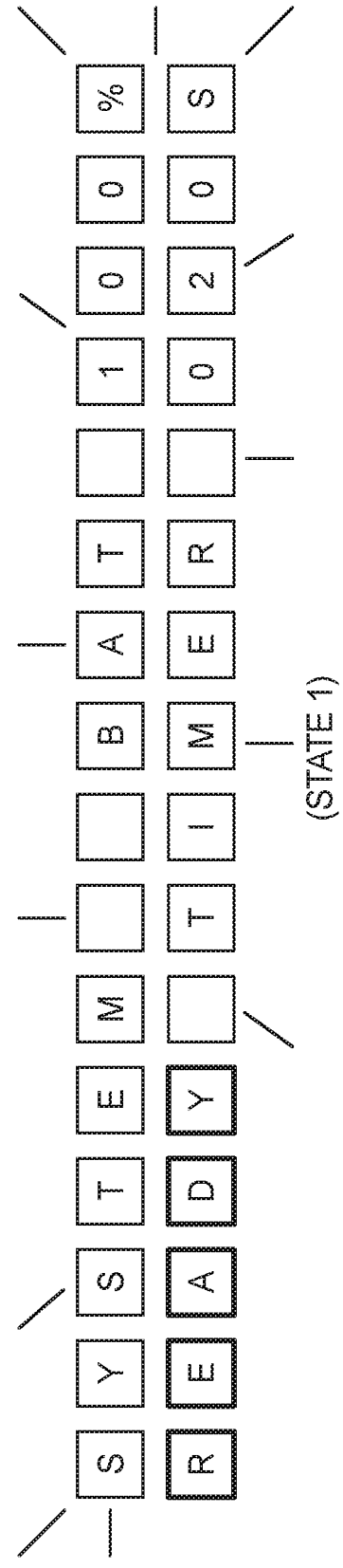

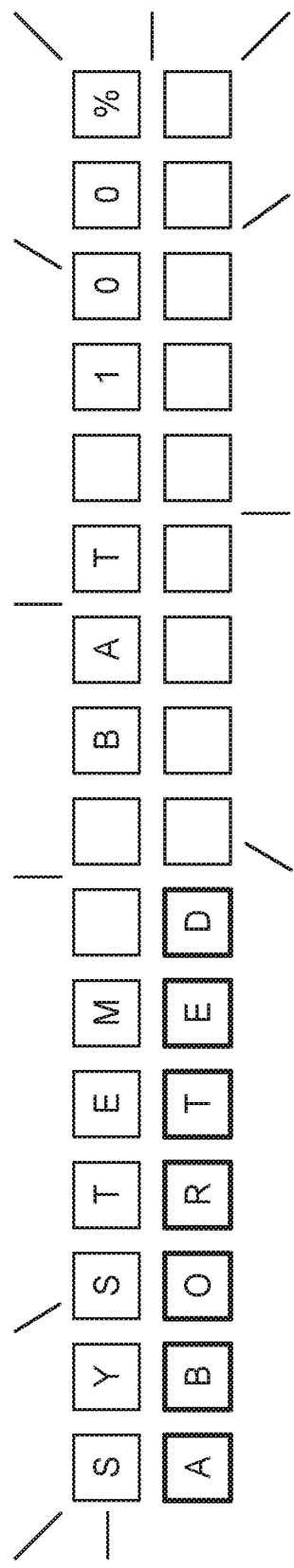
Fig. 17 (STATE 6)
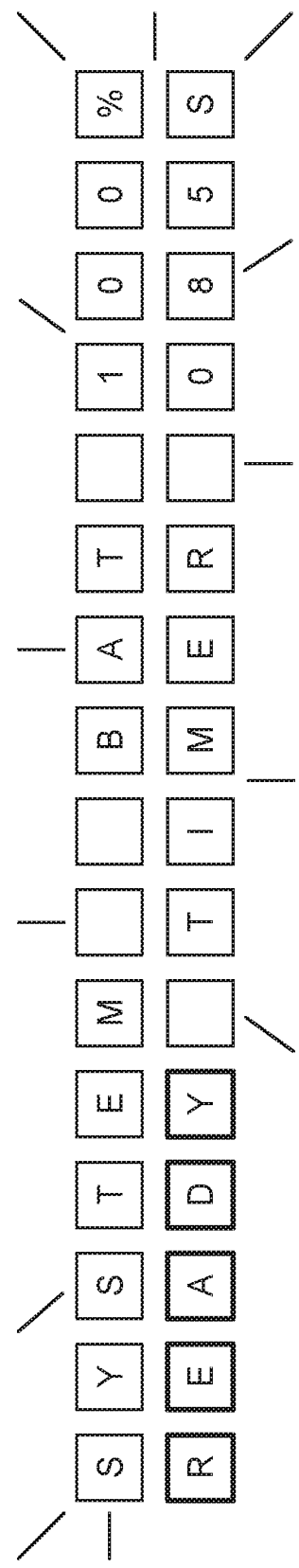
Fig. 18 (STATE 1)

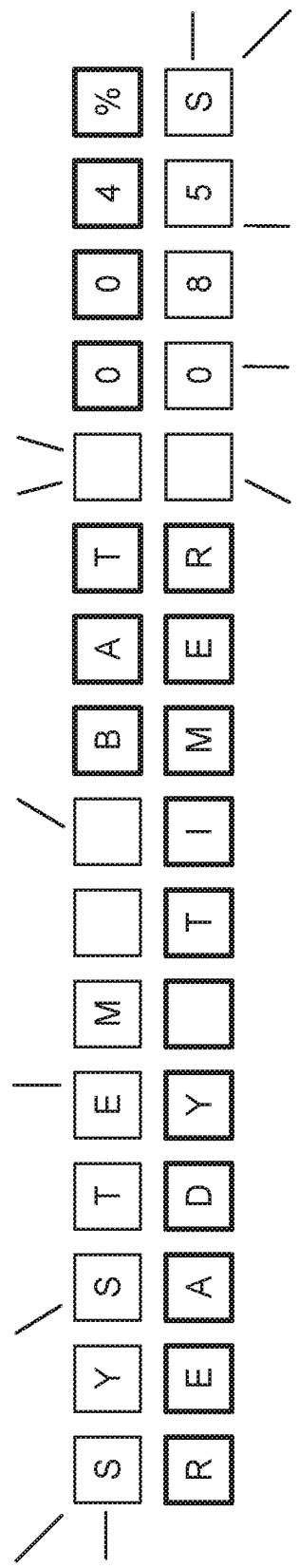
Fig. 19 (STATE 7)
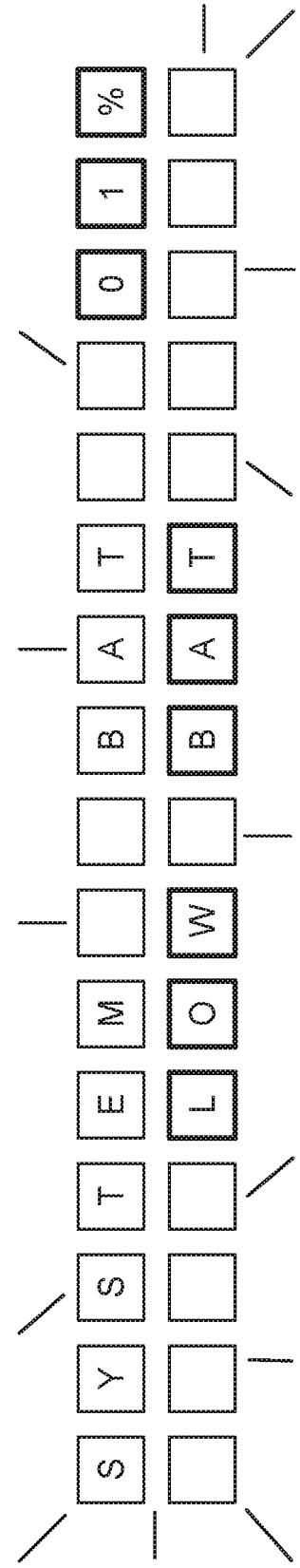
Fig. 20 (STATE 8)

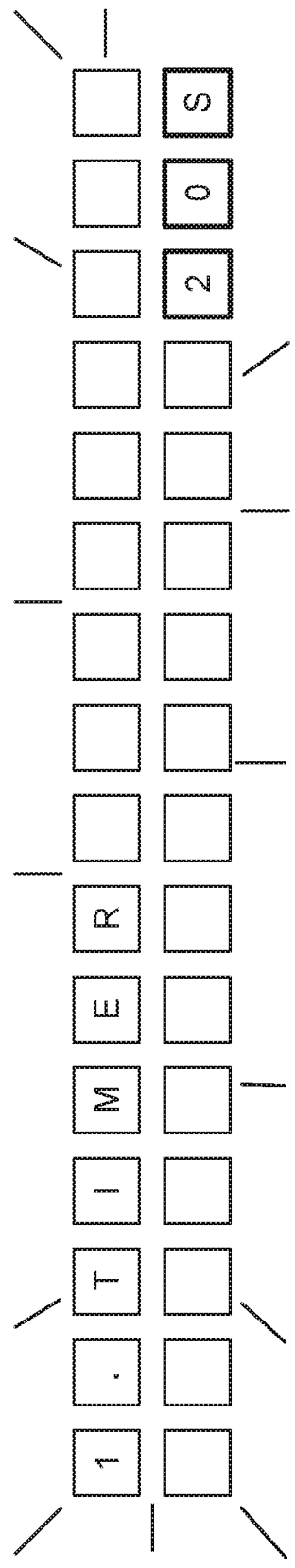
Fig. 21 (STATE 9)
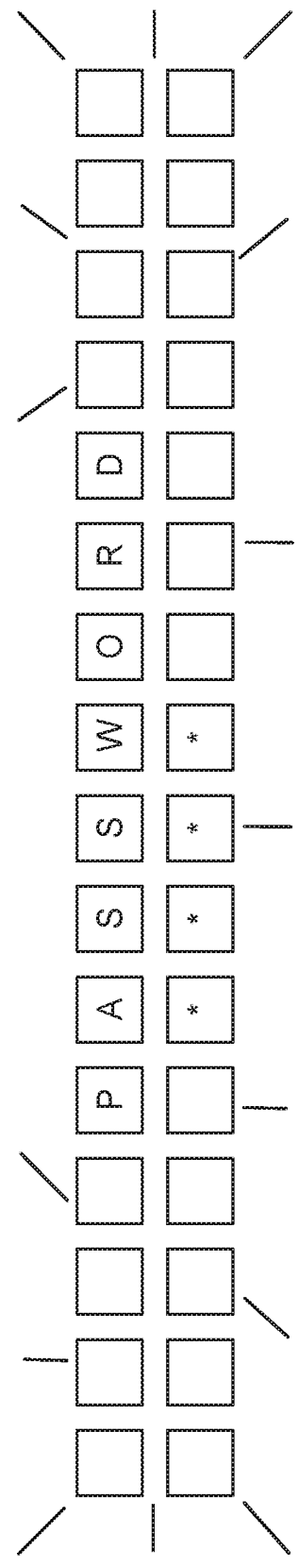
Fig. 22 (STATE 10)

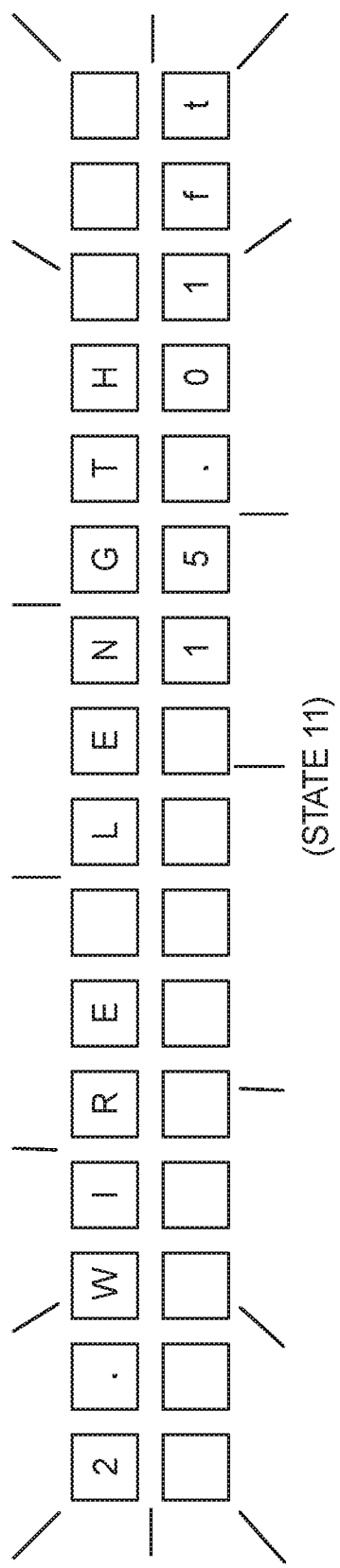
Fig. 23 (STATE 11)
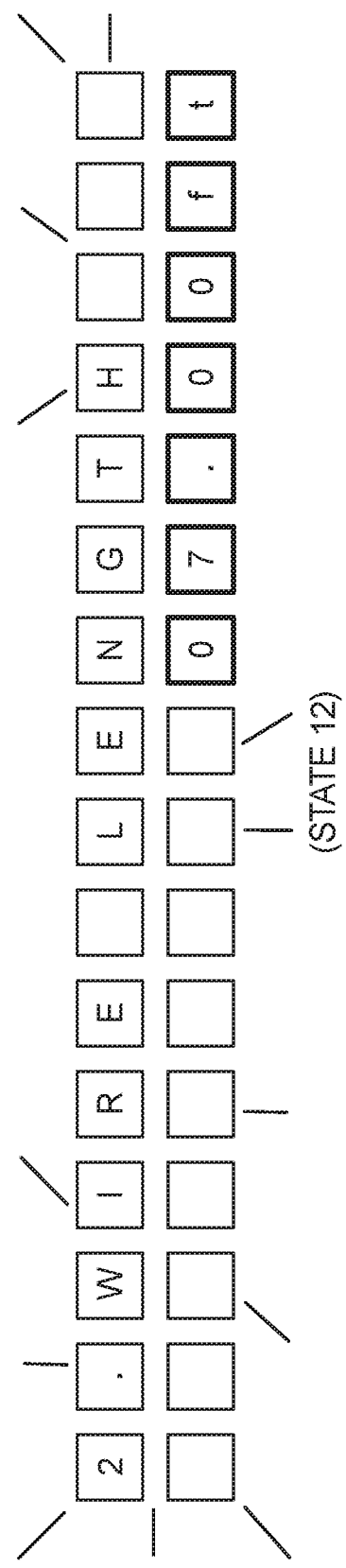
Fig. 24 (STATE 12)

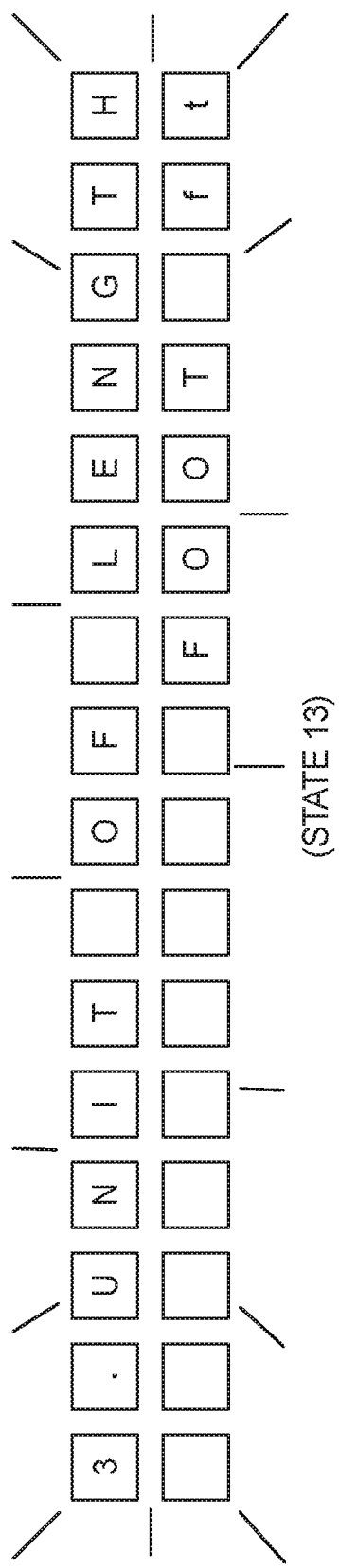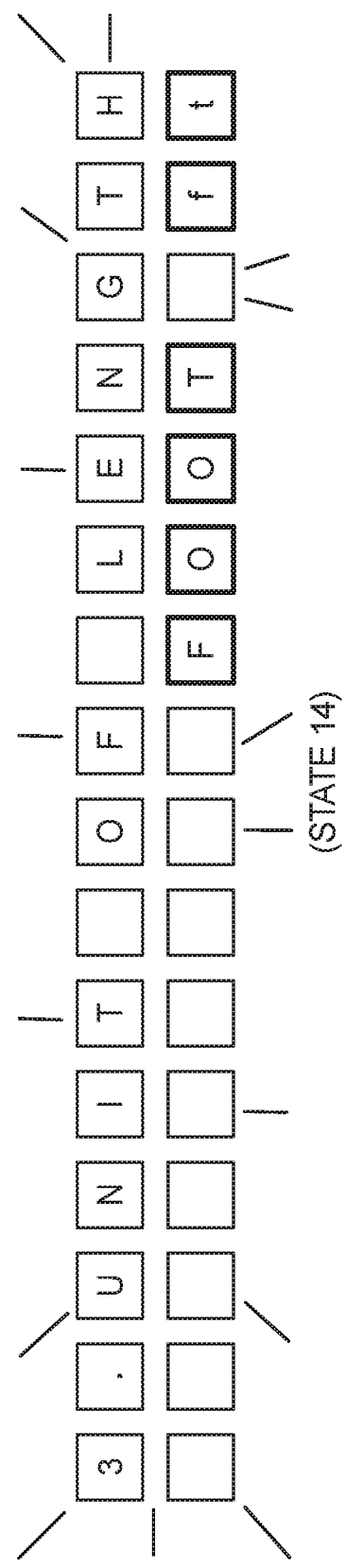

REMOTE CONTROL FOR EXOTHERMIC REACTION MOLD

CROSS-REFERENCE TO RELATED APPLICATION

This application claims the benefit of U.S. Provisional Application No. 62/295,890, filed on Feb. 16, 2016, titled "REMOTE CONTROL FOR EXOTHERMIC REACTION MOLD," which is hereby incorporated herein in its entirety by reference.

BACKGROUND

Field

The present disclosure relates to remote controls and, more particularly, to remote controls for exothermic reaction molds (moulds).

Description of the Background Art

Exothermic reaction welding is often used for providing a permanent joint between metal parts including ground rods, wire cables, piping, etc.

As shown in FIGS. 1A-IC, a reusable mold 10 includes an internal crucible 12 and a mold portion 14 below the crucible 12 for holding the part or parts (e.g., cables 15, 17) to be joined. Although not shown, an orifice extends from the internal crucible 12 to the mold portion 14. A disc of material 40 (generally steel) is placed in a bottom portion of the crucible 12 and an exothermic powder 16 (e.g., an exothermic weld powder) is poured into the crucible 12 on top of the disc of material 40. The mold 10 includes a removable cover 18 (which is generally hinged to the lower portion of mold 10) having a hole (not shown) extending there through from the top of the cover 18 to the crucible 12. Various methods exist for igniting the exothermic powder 16. When the exothermic powder 16 ignites, an exothermic reaction is created in the crucible 12. The exothermic reaction liquefies the exothermic powder 16 and the disc of material 40 which then flow down from the crucible into the mold portion 14 holding the parts to be joined. When the mold 10 has cooled sufficiently, the mold is removed, leaving the parts (e.g., cables 15, 17) welded together with a solid molecular bond. During the exothermic reaction, sparks, flames and hot gasses may be discharged from the mold 10. A cable 20 for remote operation is attached to an ignition box 22.

As shown in FIG. 1B, a disposable ignitor 24 is plugged into a port 26 provided in the ignition box 22. Disposable ignitor 24 includes one or more contacts 25 which engage contacts provided in port 26. The distal end 27 of ignitor 24 includes the ignition material which may include a strip of wire of two different metallic elements in contact with each other. For example, the metallic elements may be palladium and aluminum. As shown in FIG. 1C, the distal end 27 of disposable ignitor 24 is slipped into the hole (not shown) in the cover 18 of the mold 10 and into the exothermic powder 16. Generally, controller unit (remote ignition unit and/or system) 100 includes an on/off switch and a trigger button. When controller 100 is turned on and the trigger button is pressed, a pulse of energy is sent from controller 100 to the disposable ignitor 24 via cable 20. Ignitor 24 ignites which, in turn, ignites the exothermic powder 16 from the spark generated, starting the exothermic reaction.

One method of igniting the exothermic powder 16 involves pouring an ignition powder (also called starting powder) into the hole (not shown) in the cover 18 of the mold 10. The ignition powder is then ignited using a spark or ignition source such as a flint gun. The ignition powder ignites the exothermic powder 16 starting the exothermic reaction. Because the exothermic reaction occurs so quickly, this method forces the user igniting the ignition powder to be in close proximity to the sparks, flames and hot gasses creating a potential hazardous situation.

Another method of igniting the exothermic powder utilizes a remote ignition system connected by a length of cable. Although the remote ignition system allows the user to be a distance from a mold during the exothermic reaction, the distance is limited by the length of cable. In addition, in some instances, it may be necessary to weld parts in locations not easily physically accessible by the user (trenches or wells, etc.) In these instances, although it may be possible for the user to arrange the mold and parts to be joined, it may be difficult or impossible for the user to be in a safe position for igniting the exothermic reaction using the length of cable available at that time.

Accordingly, a need exists to mitigate or solve one or more of the problems with current exothermic reaction molds.

SUMMARY

A programmable exothermic reaction controller unit includes input/output control circuitry for inputting and outputting information to/from the controller, processing circuitry including user programmable parameters, wherein the parameters are programmable using the input/output control circuitry and an output connector connectable to an ignitor cable.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIGS. 8-26 are various display states displayed to a user according to illustrative embodiments of the present disclosure.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Illustrative embodiments of the present disclosure may be provided as improvements to remote ignition systems. For example, a remote ignition system for starting an exothermic reaction may include a time delay settable by the user.

Illustrative embodiments of the present disclosure provide a programmable controller that allows a user to set a time delay for triggering an exothermic reaction.

According to an embodiment of the present disclosure, a programmable controller includes a display for presenting information to the user and a keypad allowing the user to modify certain parameters.

In certain illustrative embodiments described herein, a box holding the controller circuitry may be constructed from metal (e.g., stamped steel, spring steel, and/or aluminum), plastic (e.g., polycarbonate or nylon) or a combination of such materials. Alternatively, steel, brass, aluminum or other appropriate alloy may be used for the appropriate components. Of course, other types of materials such as other types of plastics, composites, etc. may be used as desired and where appropriate.

Figure 1A:
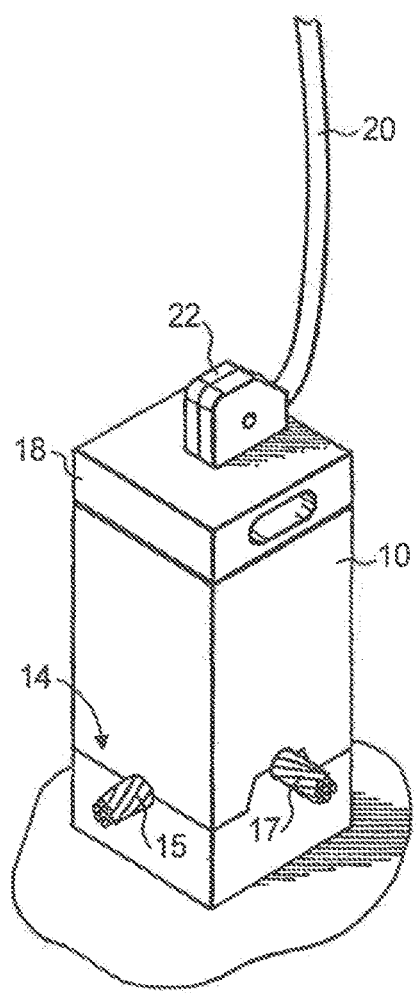
FIGS. 1A-1C depict an exothermic reaction system utilized by embodiments of the present disclosure.
Figure 2:
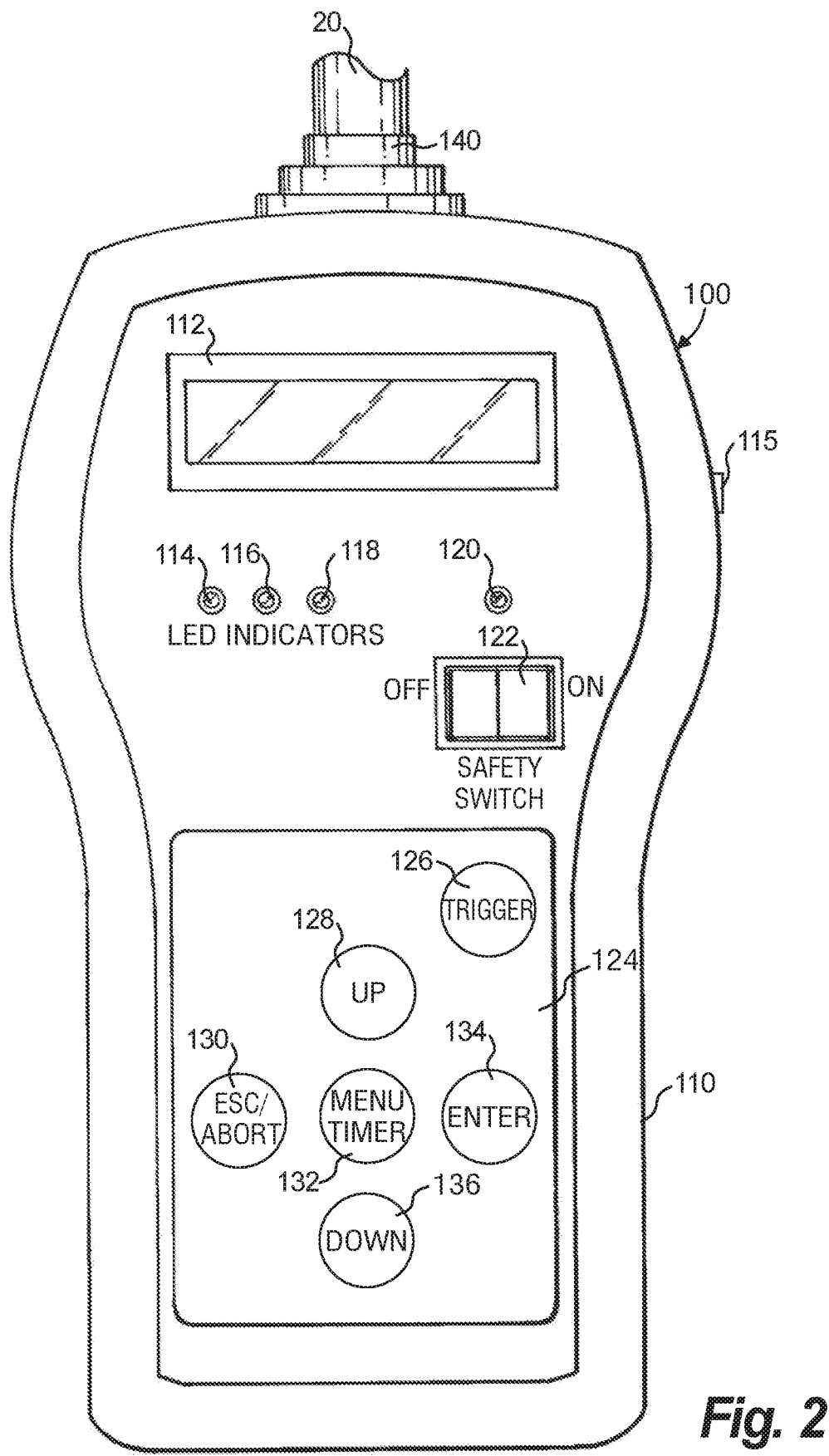
FIG. 2 is a front view of an exothermic reaction system controller unit according to an illustrative embodiment of the present disclosure.

A representative remote ignition controller according to an embodiment of the present disclosure is shown in FIG. 2 and is referred to generally as controller unit 100. According to this embodiment of the present disclosure, the components of the controller are provided in a compact control box enclosure 110. The input/output controls are provided on a front face of the enclosure 110 as shown. Controller 100 includes a display 112. According to an embodiment of the present disclosure, display 112 is a liquid-crystal display (LCD) including two rows of 16 characters. Of course, display 112 may be formed from any suitable type of display including light-emitting diodes (LEDs), organic light-emitting diodes (OLEDs), etc. Several LED indicator lights are provided including red light 114, amber light 116 and green light 118, the function of each of which will be described later below. A red LED indicator light 120 is also provided. Safety switch 122 is a rocker, captive button, sliding or toggle switch capable of toggling between "OFF" and "ON" positions as shown. A control keypad 124 including a series of touch buttons is used to provide user input to controller 100. Touch buttons include TRIGGER button 126, UP button 128, ESCAPE/ABORT button 130, MENU TIMER button 132, ENTER button 134 and DOWN button 136. An output connector 140 is provided so that a cable 20 (FIG. 1A) can be removably attached to the controller 100. The controller 100 includes a power on/off switch 115.

As shown in FIG. 2, the exothermic reaction system controller unit includes the controller 100 which is remotely connected to an ignition box 22 in FIGS. 1A-IC via wire or cable 20. Cable 20 may have connectors so that cable 20 can be removably attached to ignition box 22 and controller 2. In the alternative, cable 20 may be permanently connected to ignition box 22 and removably attached to controller 2. Different lengths of Cable 20 are made available to the user, allowing the user to select the proper length cable for a particular job. In some embodiments, the cable is selected from predetermined lengths of 3 ft (feet), 7.5 ft, 15 ft and 30 ft. In some embodiments, the cable is selected from predetermined lengths of 6 ft, 15 ft, 20 ft, 1.8 m (meters), 4.5 m, or 6 m. However, the cable 20 is not limited to any particular length or set of lengths.

Figure 3A:
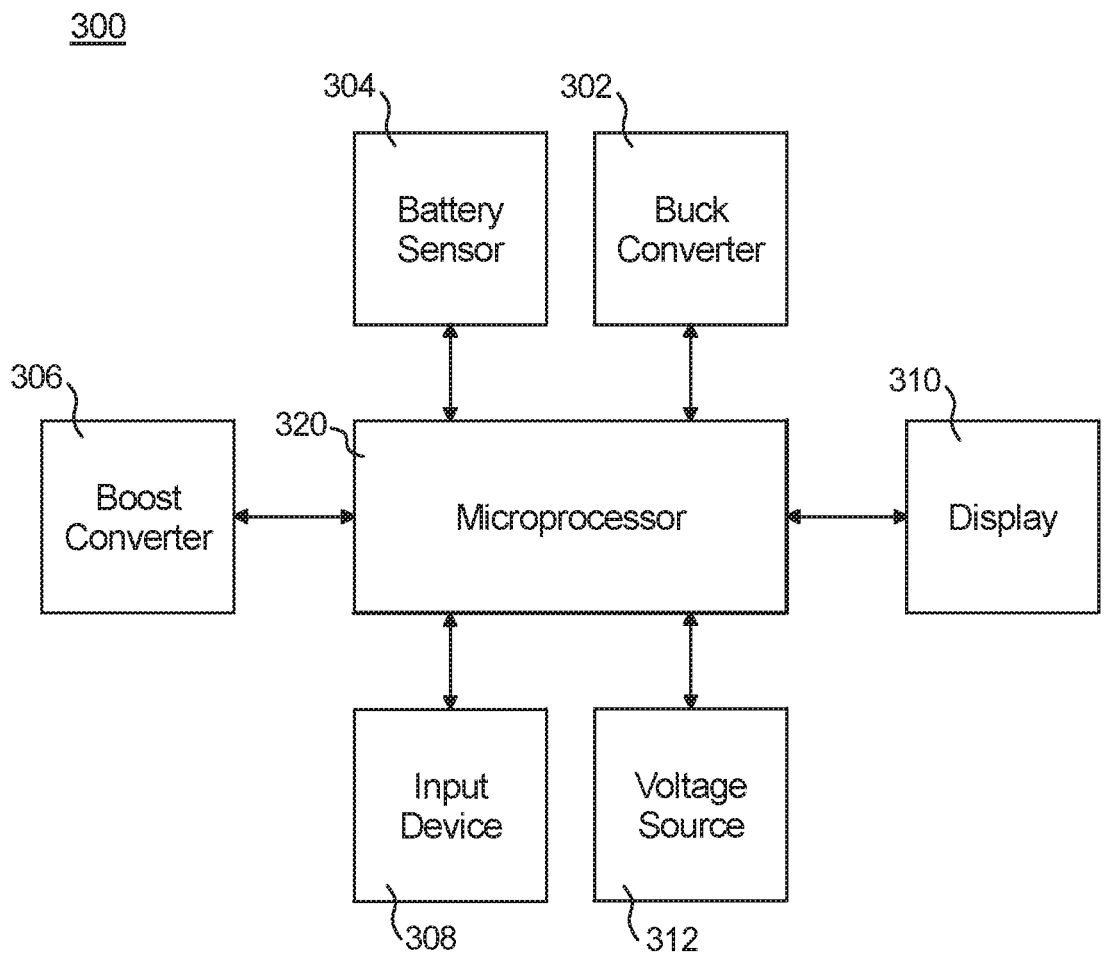
FIG. 3A is block diagram of electronic components for an exothermic reaction system controller according to an embodiment of the present disclosure.

FIG. 3A is a block diagram depicting the electronic components 300 forming the controller 100. The electronic components 300 include a microprocessor 320 such as microcontroller PIC16F1717 provided by MICROCHIP. Microprocessor 320 is an 8-bit processor and includes internal 14 KB programmable flash memory and 1 KB RAM. Of course, other suitable microprocessors and/or discrete memory components may be utilized. Electronic components 300 include a voltage step down and current step up circuit such as Buck Converter 302. A step-up converter such as Boost Converter 306 is also provided. Boost Converter 306 is controlled by microprocessor 320 and the output of Boost Converter 306 is wired to output connector 140 (FIG. 2). Battery sensor circuitry 304 is provided for sensing the voltage being output by voltage source 312. According to an embodiment of the present disclosure, voltage source 312 includes one or more dry cell batteries (e.g., Lithium-Ion batteries). Input device 308 includes circuitry for inputting information to microprocessor 320 from keypad 124 and safety switch 122. Display 310 includes circuitry for outputting information to display 112 and controlling LEDs 114-120.

Figure 1B:
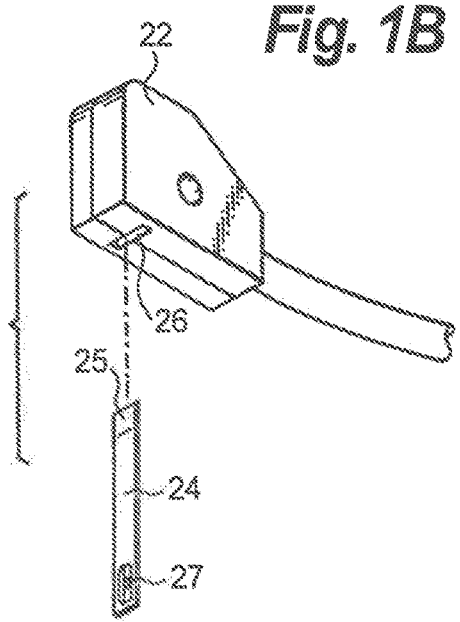
Figure 1C:
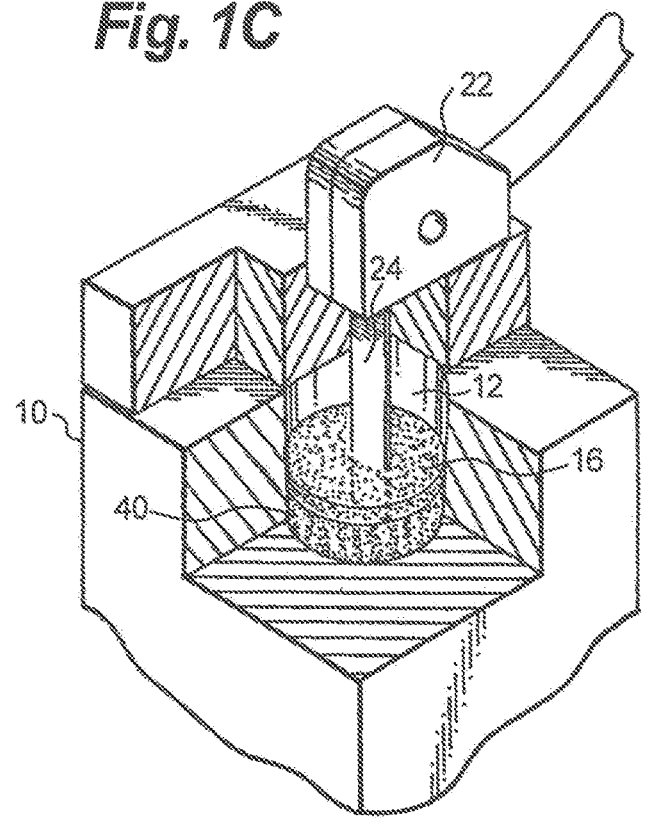
Figure 3B:
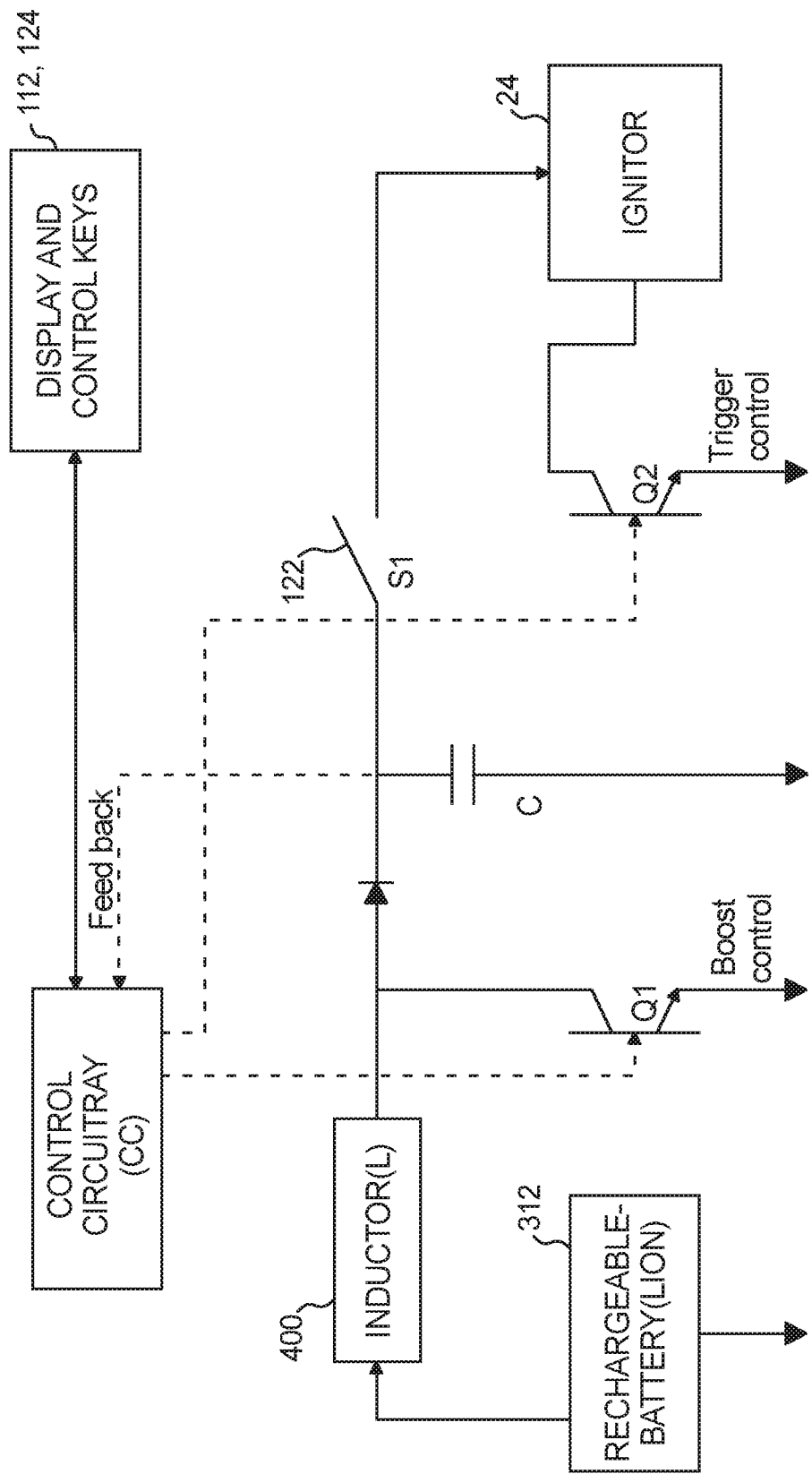
FIG. 3B illustrates the overall architecture for describing some working principles of the controller components, according to an embodiment of the present disclosure.

FIG. 3B illustrates the overall architecture for describing some working principles of the controller components 300, according to an embodiment of the present disclosure. The controller may be powered by a voltage source 312 which, for example, may be one or more rechargeable batteries. After the controller is powered on using on/off switch 115 (FIG. 2), an inductor (400) and boost control transistor (Q1) (parts of the Boost converter 306) together charge capacitor (C) to a defined voltage. This voltage is determined by the microprocessor 320 based on the length of cable 20 (FIG. 1A) which is input to the controller by a user. The controller than presents a ready message to the user utilizing display 112. The control keypad 124 is used to modify certain operating parameters including setting a timer, inputting cable length information and to otherwise operate the controller circuitry. When TRIGGER button 126 (FIG. 2) is pressed, control circuitry (CC) including microprocessor 320 (FIG. 3A) begins a countdown of the timer. When the timer reaches zero, trigger control transistor (Q2), which is enabled by the control circuitry (CC), sends a voltage pulse to the ignitor 24 (FIG. 1B) which ignites. A heavy duty switch S1 (Safety Switch 122 (FIG. 2)) functions as a safety switch. For example, when switch S1 is open, the ignitor will not ignite. When switch S1 is closed, the ignitor will ignite. When switch S1 is closed, red LED light 120 is lit indicating that the system is armed.

A flow chart describing the operation of controller 100 is shown in FIGS. 4-7. Upon power up using on/off switch 115 (FIG. 2) (Step S1) a battery voltage determination is made (Step S2). If the voltage is low (e.g., below 1% remaining), a low battery red LED indicator light 114 (FIG. 2) is activated (Step S4). The controller unit 100 is then automatically shut down (Step S6). If the battery voltage has less than 5% but more than 1% remaining, an amber warning battery LED indicator light 116 (FIG. 2) is activated (Step S8). If the battery has more than 5% remaining, the process enters a ready state (Step S10) waiting for user input (Step S12). If Menu Timer button 132 is pressed once (Step S14) the process proceeds to the Timer Menu flow shown in FIG. 5. If Menu Timer button 132 is pressed twice in succession, (Step S16) the process proceeds to the Program Menu flow shown in FIG. 6. If Trigger button 126 is pressed, a determination is made whether the triggering Safety Switch 122 is ON (Step S18). If the Safety Switch 122 is OFF (Step S20), the process returns to the ready state (Step S10) waiting for user input (Step S12). If Safety Switch 122 is ON and timer is set to 0, the device is triggered (Step S22) and a voltage pulse signal is sent to the output to trigger the ignitor 24. When Safety Switch 122 is on, red LED indicator light 120 is lit.

Figure 4:
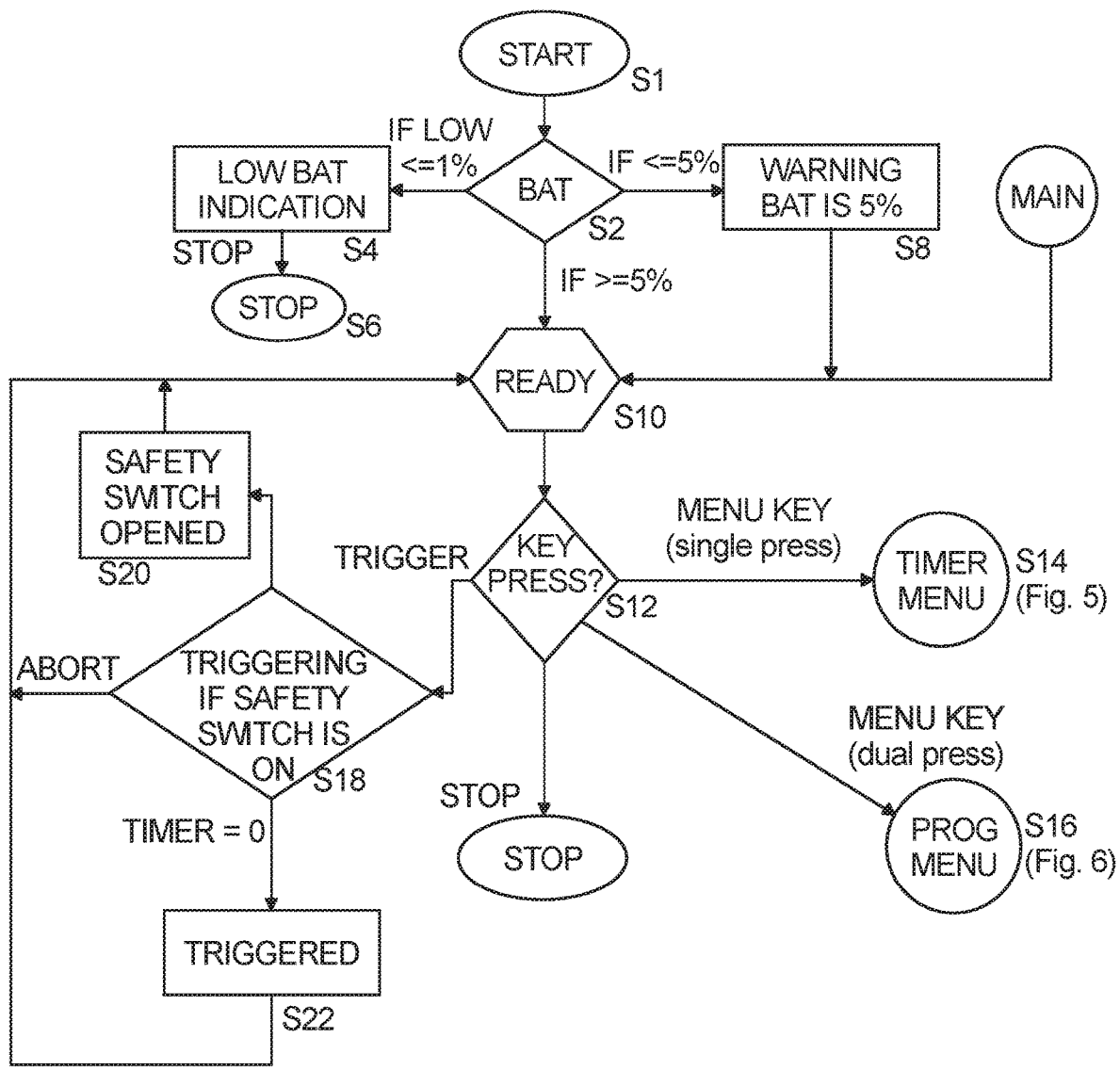
FIGS. 4-7B are flow charts for describing aspects of the processes performed by the controller according to various illustrative embodiments of the present disclosure.
Figure 5:
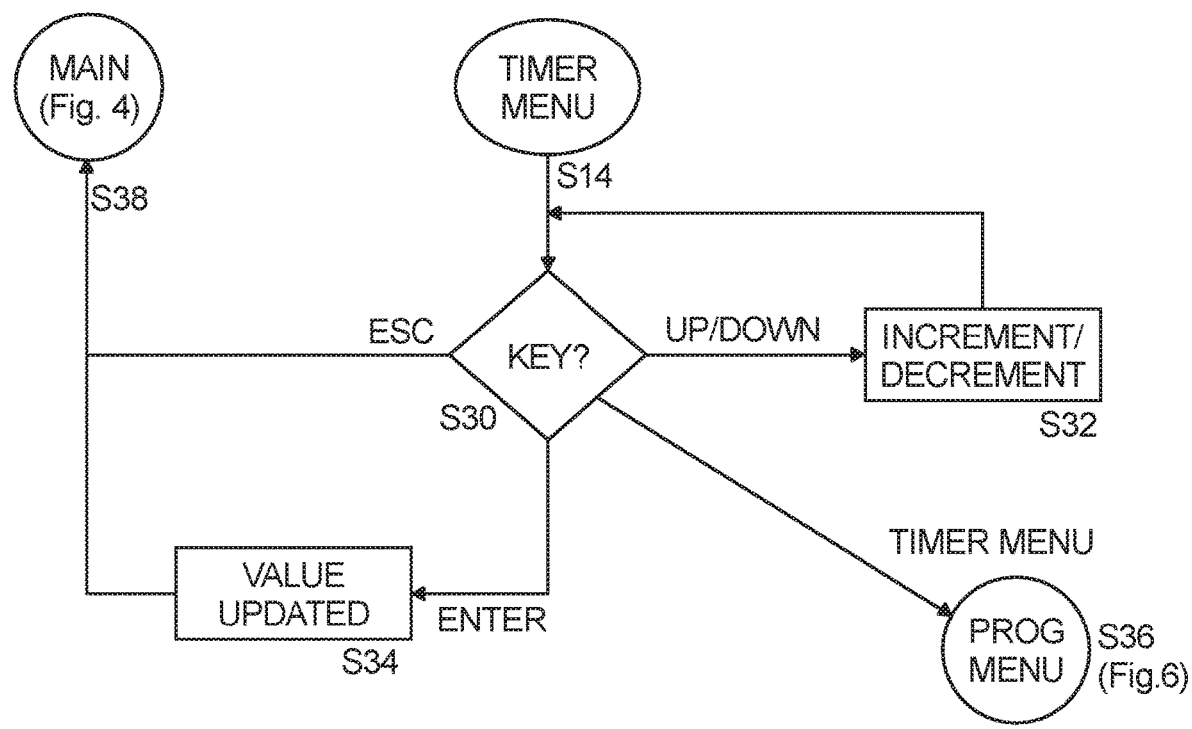

As shown in FIG. 5, the first time Menu Timer button 132 is pressed (Step S14) the system waits for a key input (Step S30). If UP button 128 or DOWN button 136 (FIG. 2) is pressed, the time indicated in timer display shown on display 112 is incremented or decremented accordingly (Step S32). For example, the timer may be set to 20 seconds by default. The user can then change the timer using UP button 128 and DOWN button 136. If the user is satisfied with the time displayed, pressing ENTER button 134 will set the timer to that value (Step S34). If Menu Timer button is pressed a second time (Step S36) immediately after the first time it is pressed, the process proceeds to the program flow shown in FIG. 6. If the ESCAPE/ABORT button 130 is pressed, the process proceeds (Step S3) to the Main flow Ready state shown in FIG. 4.

Figure 6:
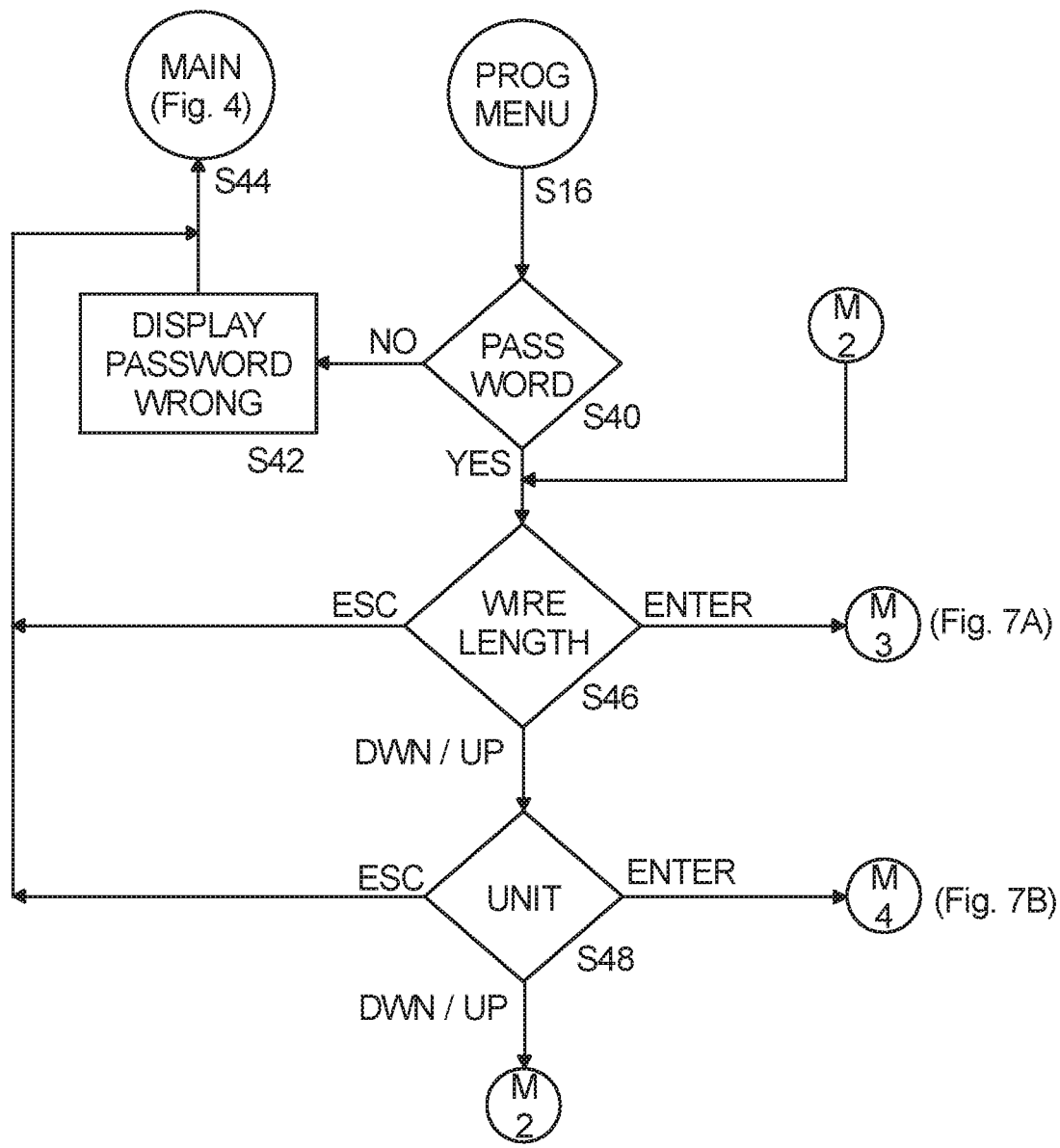
Figure 7A:
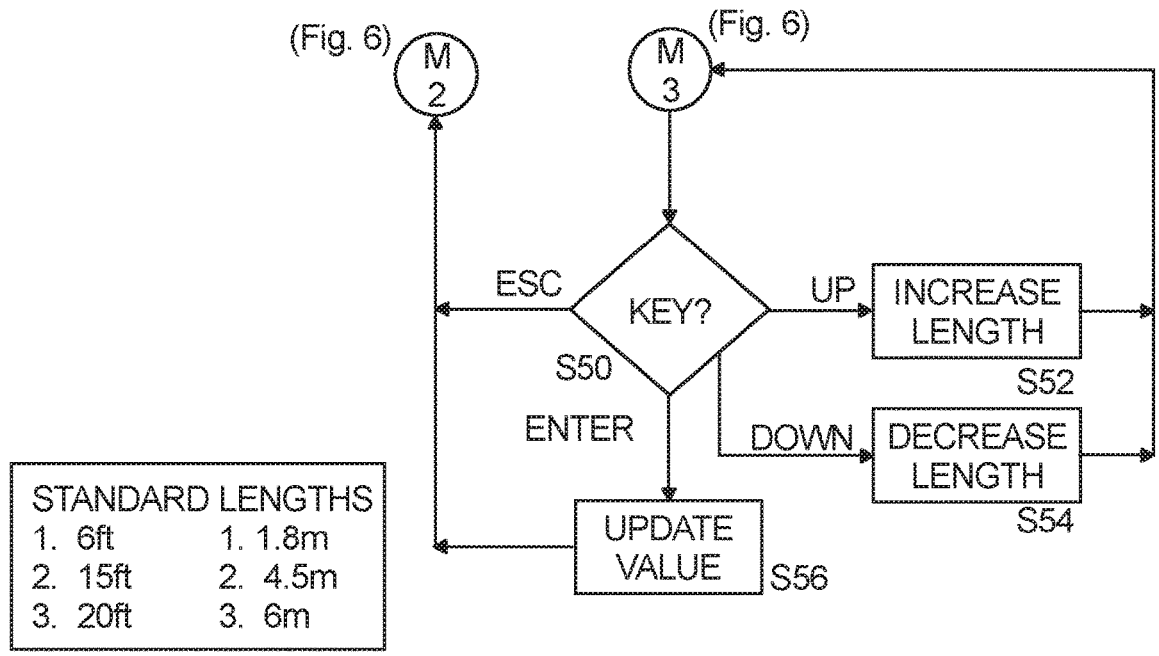
Figure 7B:
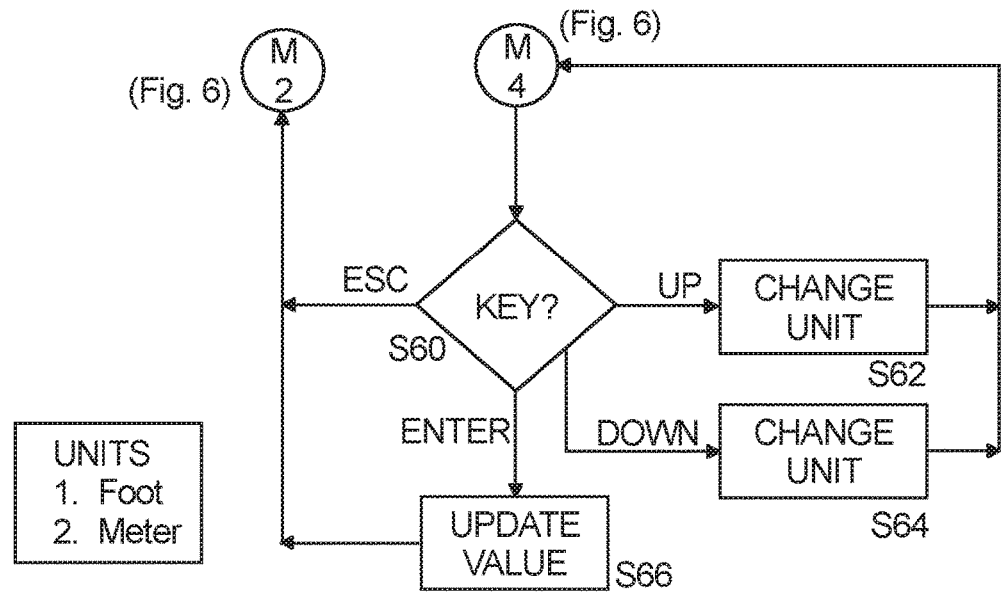

As shown in FIG. 6, when the program menu mode Step S16 is entered, the user is prompted to enter a password (Step S40). For example, the password may be a specified sequential combination of buttons on keypad 124. If the entered password is not correct (No, Step S40), a message is displayed to the user that the password is wrong (Step S42). The flow then proceeds to the main program flow (e.g., the Ready state S10 (FIG. 4). If the entered password is correct (Yes, Step S40), the user is given the option to enter the length of the cable 20 that is being utilized. For example, pressing the ENTER button 134, the process proceeds to FIG. 7A waiting for a key input (Step S50). If the user presses UP button 128 (FIG. 2), the cable length is increased each time the UP button is pressed (e.g., from 6 feet to 15 feet to 20 feet or from 1.8 meters to 4.5 meters to 6 meters) (Step S52). Pressing the DOWN button 136, the cable length is decreased (e.g., from 20 feet to 15 feet to 6 feet or from 6 meters to 4.5 meters to 1.8 meters) (Step S54). Pressing the ENTER button 134, the cable length value is updated and stored (Step S56). The process then returns to the flow M2 (FIG. 6). Pressing the UP button 128 or the DOWN button 136 at this time will then let the user change the units of measurement of the cable (Step S48). Pressing the ENTER button 134, the process proceeds to FIG. 7B (M4) waiting for a key input (Step S60). If the user presses UP button 128 (FIG. 2), the units are changed from Feet to Meters (Step S62). Pressing the DOWN button 136, the units are changed from Meters to Feet (Step S64). Pressing the ENTER button 134, the Units Value is updated and stored (Step S66). The process then returns to M2 (FIG. 6). Pressing the Escape/Abort button at Steps S46, S48 will return the user to the main ready state (Step S10 (FIG. 4)).

Figure 12:
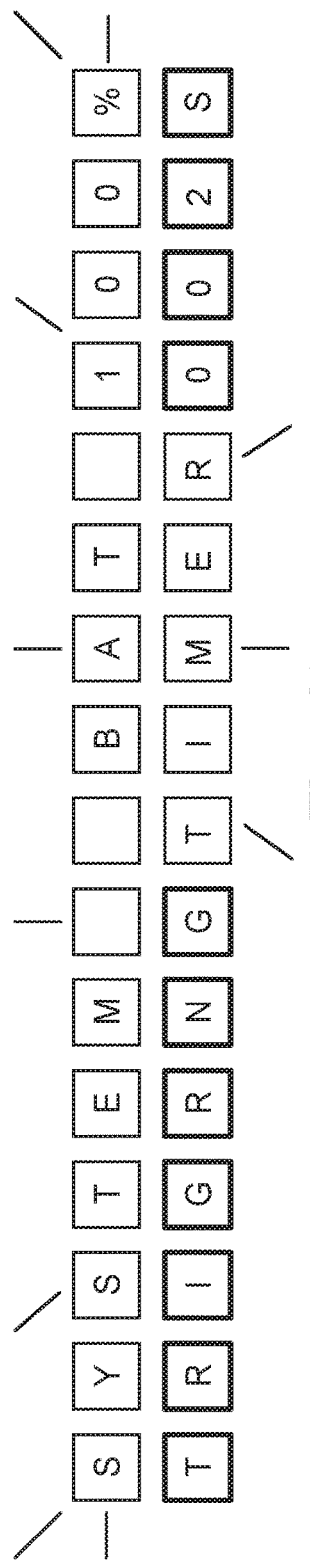
Figure 13:
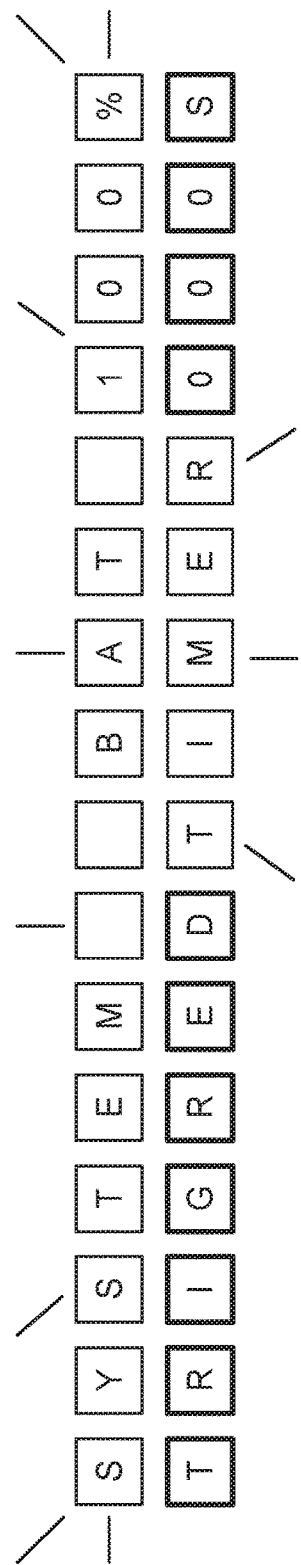
Figure 14:
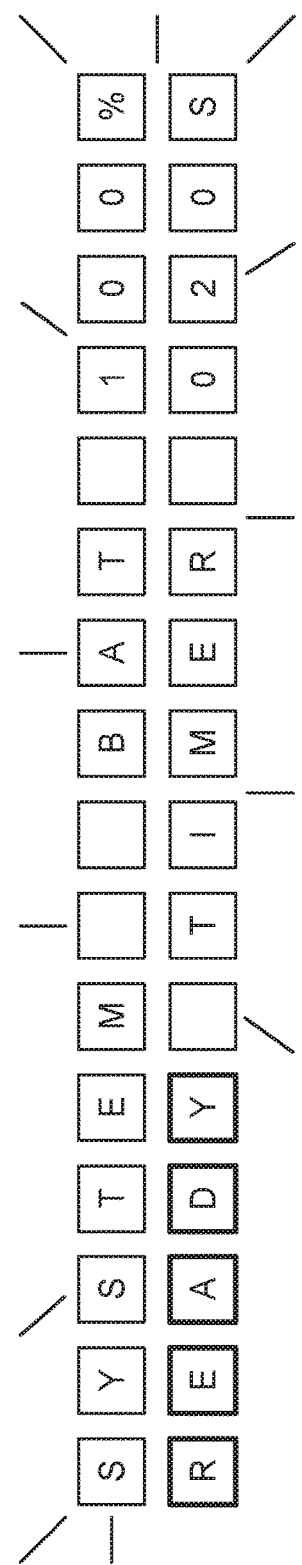
Figure 15:
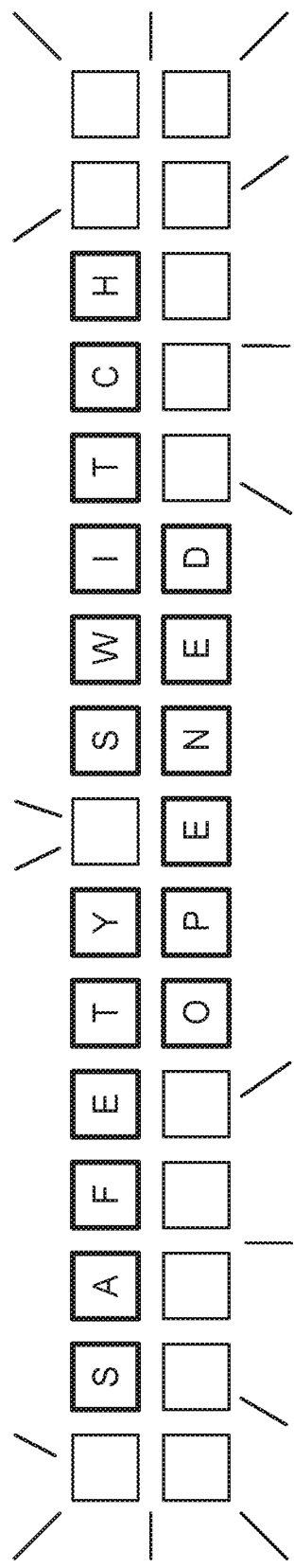
Figure 16:
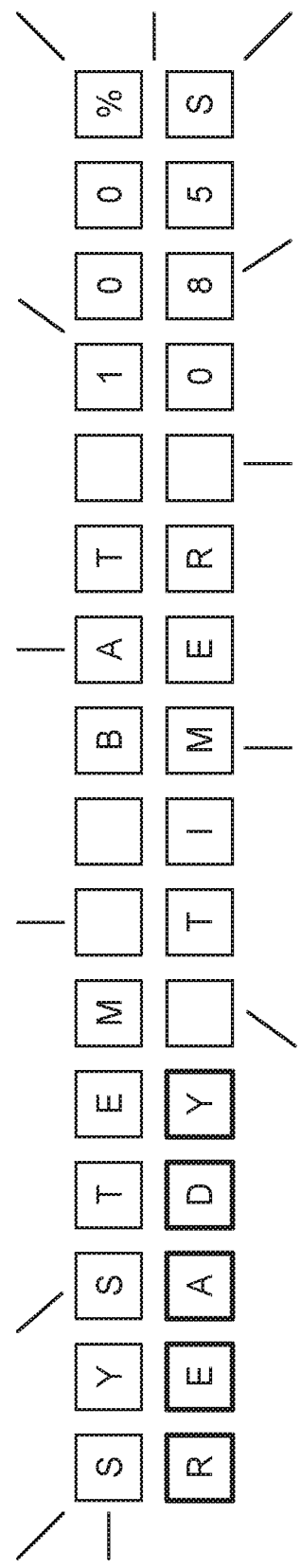

FIGS. 8-26 depict display states that may be presented to the user via display 112. According to an embodiment of the present disclosure, the portions of the display shown in bold in FIGS. 8-26 will blink. When the power switch 115 (FIG. 2) is turned on, the message shown in FIG. 8 is displayed to the user (State 1). After a predetermined amount of time (e.g., 5 seconds), the message shown in FIG. 9 is displayed to the user (State 2). In this example, the message indicates that the battery has 100% remaining and that the timer is set for 85 second delay. The user then has several options. By pressing the MENU/TIMER button 132 and then using the UP button 128 or DOWN button 136, the user can modify the timer value (e.g., in 5 second intervals). During this time, the display will look as shown in FIG. 10 (State 3). The timer value (e.g., 20S) will blink. Pressing the ESCAPE button 130 at this time will return to the display shown in FIG. 9 (State 2). After the timer is set to the appropriate delay time, the user presses the ENTER button 134 and the timer value stored in memory is updated. The message shown in FIG. 11 is then displayed to the user (State 1, updated with the new timer value). When the user presses TRIGGER button 126, the countdown timer as shown in FIG. 12 will be displayed (TRIGRNG and 002S will start to blink) and count down will start. When the timer reaches zero, the trigger signal is output by the controller and the message shown in FIG. 13 is displayed to the user (Trigred and 000S will blink). After a predetermined amount of time (e.g., 5 seconds) the system will then enter the ready condition and the message shown in FIG. 14 will be displayed (READY will blink). If the user presses the Escape/Abort button 130 during the countdown, the countdown is aborted and the message shown in FIG. 17 (State 6) is displayed (ABORTED will blink). After a predetermined amount of time (e.g., 5 seconds) the system will enter the ready condition and the message shown in FIG. 18 (State 1) is displayed. If the user presses TRIGGER button 126 while safety switch 122 is OFF, the message shown in FIG. 15 is displayed (SAFETY SWITCH OPENED will blink). After a predetermined amount of time (e.g., 5 seconds), the message shown in FIG. 16 is displayed (State 1). If the remaining power level falls to between 5% and 1%, the message shown in FIG. 19 is displayed (State 7) ("BAT" and "004%" will blink). This is a warning to the user that the battery life is almost done. However, the user can continue with the trigger operation. When the remaining power level falls to 1%, the message shown in FIG. 20 is displayed (State 8) (01% and LOW BAT will blink at a faster rate). During this time, no keys will work and no triggering operation can occur until new batteries are installed. Programming of the controller can be performed when the system is in the READY condition (State 1). When the MENU button 132 is pressed one time, a Timer message such as that shown in FIG. 21 will be displayed (State 9). Pressing the UP button 128 and the DOWN button 136, the user can change the displayed timer (e.g., in 5 second intervals). Pressing the ENTER key 134, from the screen shown in FIG. 21, the system will prompt the user to enter a password with the message shown in FIG. 22 (State 10). For example, the password may be set to any sequence of keys Up—Down—Esc and Enter, in any combination. If the password is entered correctly by the user, the message shown in FIG. 23 is displayed (State 11) showing the presently set cable length. Pressing ENTER button 134 displays the message shown in FIG. 24 (State 12), allowing the user to set the length of the cable being utilized. The lengths are predetermined values and may be, for example, 3 ft, 6 ft, 7 ft, 15 ft and 20 ft (or 1.8 m, 4.5 m and 6 m if in metric). Pressing the Up button 128 or the Down button 136 will cycle through the predetermined values. When the proper length is displayed, pressing the Enter button 134 will update and stored the set cable length in memory and the message displayed will return to FIG. 23 (State 11) displaying the newly updated value. The predetermined cable length values can be changed in the source code if desired. It should be noted that pressing the Escape/Abort button 130 always moves the display to the previous display without updating any values. Updated values will remain in memory until modified. Pressing the Up button 128 or Down button 136 when the message in FIG. 23 (State 11) is being displayed, the user is given the option to change the units of cable length by displaying the message shown in FIG. 25 (State 13). Pressing Enter button 134, the display will show the message depicted in FIG. 26 (State 14). Pressing the UP button 128 or DOWN button 136 will then cycle through the predetermined units that can be selected for the cable length (e.g., FEET, INCHES, METERS, CENTIMETERS). Pressing the ENTER button 134 will update the memory with the selected unit. If desired, the predetermined units can be changed in the source code. Pressing the Enter button 134 will then return the display to the ready State 1 display.

As described herein, some embodiments disclose a programmable exothermic reaction controller including an input/output control circuitry for inputting and outputting information to/from the controller, a processing circuitry including user programmable parameters, wherein the parameters are programmable using the input/output control circuitry, and an output connector connectable between the controller and an ignitor cable.

As described herein, some embodiments disclose a programmable exothermic reaction controller including an input/output control circuitry for inputting and outputting information to/from the controller, a processing circuitry including user programmable parameters, wherein the parameters are programmable using the input/output control circuitry, and an output connector connectable between the controller and an ignitor cable, wherein the parameters include a parameter specified by the user identifying a length of the ignitor cable, the parameter displayable to the user by the display.

As described herein, some embodiments disclose a programmable exothermic reaction controller including an input/output control circuitry for inputting and outputting information to/from the controller, a processing circuitry including user programmable parameters, wherein the parameters are programmable using the input/output control circuitry, and an output connector connectable between the controller and an ignitor cable, wherein the parameters include a parameter specified by the user identifying a delay between activation of a trigger button and ignition of an exothermic powder, the parameter displayable to the user by the display.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A programmable exothermic reaction controller for an exothermic reaction mold, comprising:
    an ignition box;
    an igniter cable connected at one end to the ignition box; and
    a controller unit connected to the cable at another end, the controller unit comprising:
        an input device for receiving user programmable parameters input from a user;
        input/output control circuitry for inputting and outputting information to/from the controller and interfacing with the input device; and
        processing circuitry including the user programmable parameters, wherein the parameters are programmed into the programmable exothermic reaction controller through the input device using the input/output control circuitry,
        the input/output control circuitry configured for:
            initiating an ignition procedure for the exothermic reaction mold;
            receiving from the input device a password from the user;
            determining if the password is correct;
            when it is determined that the password is correct, receiving from the input device the parameters from the user, the parameters including at least one of a length of the igniter cable, a time to ignition, and an output voltage;
            generating a voltage pulse signal based on the parameters; and
            providing the voltage pulse signal to the ignition box to initiate an exothermic reaction.

2. The programmable exothermic reaction controller as recited in claim 1, wherein the timer is programmable in predetermined increments of time.

3. The programmable exothermic reaction controller as recited in claim 1, wherein the length of the ignitor cable is programmable in predetermined lengths.

4. The programmable exothermic reaction controller as recited in claim 1, wherein the user programmable parameters comprise units of measurement of the length of the ignitor cable.

5. The programmable exothermic reaction controller as recited in claim 4, wherein the units of measurement comprise inches, feet, yards.

6. The programmable exothermic reaction controller as recited in claim 4, wherein the units of measurement comprise centimeters, meters.

7. A programmable exothermic reaction controller having a display readable by a user for an exothermic reaction mold, comprising:
    an ignition box;
    an igniter cable connected at one end to the ignition box; and
    a controller unit connected to the cable at another end, the controller unit comprising:
        an input device for receiving user programmable parameters input from a user;
        input/output control circuitry for inputting and outputting information to/from the controller and interfacing with the input device; and
        processing circuitry including the user programmable parameters, wherein the parameters are programmed into the programmable exothermic reaction controller through the input device using the input/output control circuitry,
        the input/output control circuitry configured for:
            initiating an ignition procedure for the exothermic reaction mold;
            receiving from the input device a password from the user;
            determining if the password is correct;
            when it is determined that the password is correct, receiving from the input device the parameters from the user, the parameters including at least one of a length of the igniter cable, a time to ignition, and an output voltage;
generating a voltage pulse signal based on the parameters; and
providing the voltage pulse signal to the ignition box to initiate an exothermic reaction.

8. The programmable exothermic reaction controller as recited in claim 7, wherein the ignitor cable is connected to an ignition box.

9. The programmable exothermic reaction controller as recited in claim 7, wherein the ignitor cable is removably connected to an ignition box.

10. The programmable exothermic reaction controller as recited in claim 7, wherein the ignition of the exothermic powder causes a material to liquefy and flow from a crucible into a mold holding at least two parts to be joined.

11. The programmable exothermic reaction controller as recited in claim 7, wherein the material is primarily steel.

\* \* \* \* \*